(12) United States Patent
Nishiyama (10) Patent No.: US 7,211,780 B2
(45) Date of Patent: May 1, 2007

(54) LIGHT RECEIVING CIRCUIT USING AVALANCHE PHOTODIODE WITH A CONTROLLED VOLTAGE DIVIDER

(75) Inventor: Naoki Nishiyama, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 73 days.

(21) Appl. No.: 11/225,808

(22) Filed: Sep. 14, 2005

(65) Prior Publication Data

US 2006/0060756 A1 Mar. 23, 2006

(30) Foreign Application Priority Data

Sep. 15, 2004 (JP) .............................. 2004-268662

(51) Int. Cl.
*H01J 40/14* (2006.01)

(52) U.S. Cl. ............................. 250/214 R; 250/214.1

(58) Field of Classification Search ............ 250/214 R, 250/214.1, 205, 214 LA; 327/513–515
See application file for complete search history.

(56) References Cited

U.S. PATENT DOCUMENTS 4,438,348 A  3/1984  Casper et al.
4,479,052 A * 10/1984  Suzuki ................... 250/214 R
6,031,219 A   2/2000  Shuke
6,188,059 B1  2/2001  Nishiyama
6,643,472 B1 11/2003  Sakamoto
6,707,024 B2  3/2004  Miyamoto
2004/0079866 A1 4/2004  Nishiyama

FOREIGN PATENT DOCUMENTS

JP      11-284445   10/1999
JP      2004-071982  3/2004

* cited by examiner

*Primary Examiner*—Que T. Le
(74) *Attorney, Agent, or Firm*—Venable LLP; Michael A. Sartori (57) ABSTRACT

The present invention provides a light-receiving circuit that applies the avalanche photodiode (APD) and reduces the power consumption at a large optical input. The bias controlling circuit of the present invention provides a voltage source, a current detector, a voltage divided, and a controller. The current detector detects the photo current generated by the APD and output the current or voltage signal corresponding to the photo current. The voltage divider divides the output of the voltage source and the current or voltage signal from the current detector thereof may affect the dividing ratio. The controller operates to maintain the output of the divider constant by adjusting the output of the voltage source. Accordingly, the output of the voltage source decreases at the high optical input, thereby reducing the power consumption of the circuit.

11 Claims, 12 Drawing Sheets

FIG. 12

LIGHT RECEIVING CIRCUIT USING AVALANCHE PHOTODIODE WITH A CONTROLLED VOLTAGE DIVIDER

BACKGROUND OF THE INVENTION

1. Field of the Invention

The present invention relates to a light-receiving circuit, in particular, relates to an light-receiving circuit for an avalanche photodiode.

2. Related Prior Art

It has been well know that various bias controlling circuits to apply a bias voltage to an avalanche photodiode (APD), for example, a Japanese Patent applications published as H11-284445 and 2004-071892 have been disclosed typical examples of the bias controlling circuit. In such circuits, a resistor is connected in serial to the APD, i.e., between the bias source and the APD, to restrict an excess bias voltage to the APD. A photo current generated by the APD, which corresponds to an optical input power, flows in this resistor to cause a voltage drop thereat, and makes the bias voltage applied to the APD to decrease by this voltage drop. Accordingly, the bias voltage to the APD decreases as the input optical power increases, thereby reducing the multiplication factor M of the APD at the large optical input power and preventing the APD from breaking down.

However, the method to have the bias voltage to depend on the optical input power by using the resistor connected in serial to the APD has an disadvantage that the power dissipation of the resistor increases as the optical input power increases. Therefore, one of the objects of the present invention is to provide a light-receiving circuit for the avalanche photodiode to reduce the power dissipation.

SUMMARY OF THE INVENTION

One feature of the present invention relates to a light-receiving circuit that includes an avalanche photodiode (APD) and a bias-controlling circuit to control the bias applied to the APD. The bias-controlling circuit of the invention comprises a voltage source, a current detector, a voltage divider and a controller. The voltage source outputs a voltage output to the APD. The current detector detects a photo current generated by the APD and outputs a current signal or a voltage signal to the voltage divider. The voltage divider, including first and second resistors connected in serial, divides the voltage output of the voltage source with a dividing ratio determined by the resistance of the first and second resistors, and outputs the divided voltage. The current signal or the voltage signal output from the current detector varies the dividing ratio by supplying an extra current from the current detector or by varying an equivalent resistance of the first or second resistors by adding an active device connecting in parallel thereto and adjusting an equivalent resistance of the device. The controller, by receiving the divided voltage from the voltage divider, operates to maintain the divided voltage equal to a reference value by adjusting the voltage output of the voltage source.

In the present bias-controlling circuit, the current detector outputs the current/voltage signal depending on the photo current of the APD and the voltage divider varies the dividing ratio according to this current/voltage signal. However, the controller operates to keep the divided voltage output from the voltage divided equal to the reference value by adjusting the voltage output of the voltage source. Therefore, when a large optical signal enters the APD, the APD generates a greater photo current, the current detector outputs a large current/voltage signal, a voltage divided increases the dividing ratio, and the controller decreases the output voltage of the voltage source to equalize the divided voltage output from the voltage divider. Consequently, the bias voltage applied to the APD decrease, which reduces the power consumption of the light-receiving circuit, typically more than 20% power saving may be obtained at the optical input power greater than −9 dBm.

DESCRIPTION OF PREFERRED EMBODIMENTS

Next, preferred embodiments of the present invention will be described as referring to accompanying drawings. In the specification and the drawings below, the same symbols or numerals will refer to the same elements without overlapping description.

(First Embodiment)

Figure 1:
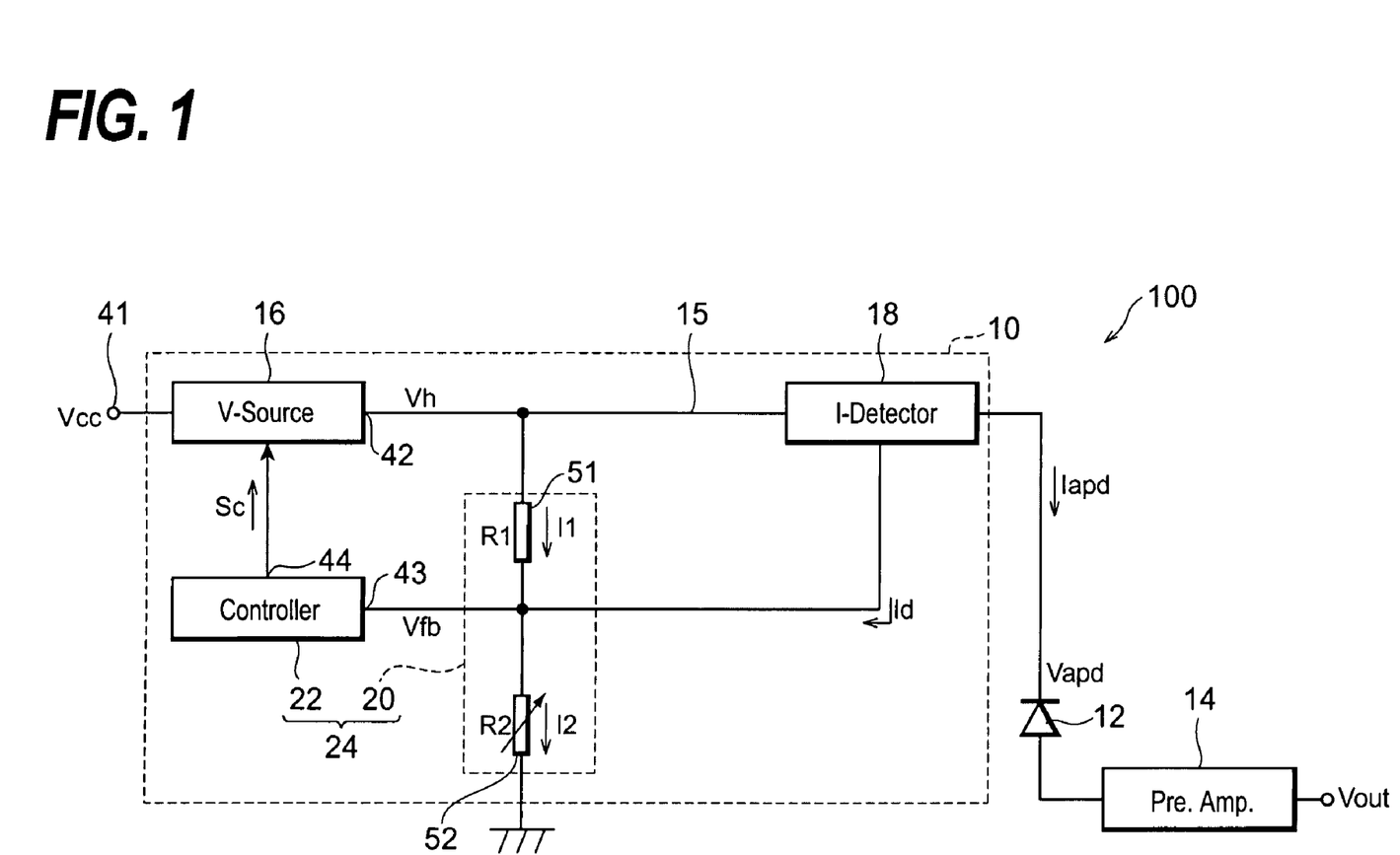
FIG. 1 is a block diagram showing a light-receiving circuit of the invention.
Figure 2:
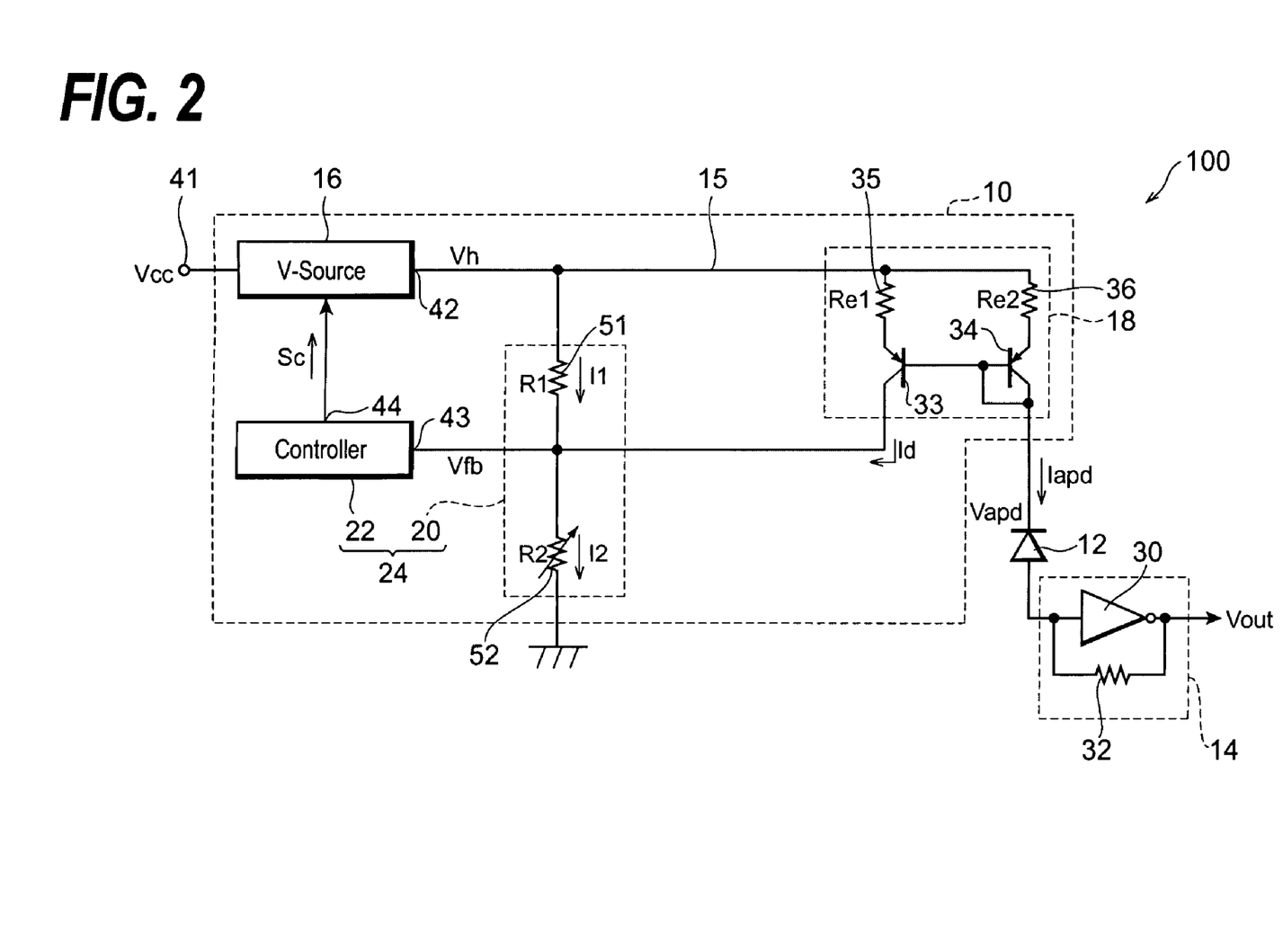
FIG. 2 is a circuit diagram showing the light-receiving circuit according to the first embodiment of the invention.

FIG. 1 is a block diagram of the present bias-controlling circuit 10 involved in a light-receiving circuit 100 and FIG. 2 is a circuit diagram thereof. A light-receiving circuit 100 includes, in addition to the bias-controlling circuit 10, an avalanche photodiode (APD) 12 and a pre-amplifier 14. The bias-controlling circuit 10 supplies a reverse bias voltage to the APD 12. The APD 12 detects an optical input signal and generates a photocurrent Iapd corresponding to the magnitude of the optical input signal with a specific multiplication factor M that depends on the bias voltage applied thereto. The anode of the APD 12 connects the preamplifier 14 that converts the photo current into a voltage output Vout with a conversion factor determined by a feedback resistor 32.

A fundamental configuration of the preamplifier will be described below. As shown in FIG. 2, the preamplifier 14 of this embodiment is a trans-impedance amplifier that includes an inverting amplifier 30 and the feedback resistor 32. However, the preamplifier 14 is not restricted to those trans-impedance amplifiers. Another configuration may be applicable, for example, a load resistor connected to the anode of the APD 12 and an amplifier to amplify a voltage signal generated by this load resistor by the photocurrent may be applicable as the preamplifier.

The bias-controlling circuit 10 comprises a voltage source 16, a current detector 18, a voltage divider 20, and a controller 22. Next, these circuit blocks will be described one after another.

The voltage source 16 generates a DC output voltage Vh. One type of the voltage source is a DC/DC-converter. An input terminal 41 of the voltage source 16 connects to the external power source Vcc. Supplying a DC voltage Vcc to the input terminal 41, the voltage source 16 boosts or steps down this external voltage Vcc to generate the output voltage Vh in the output terminal 42 thereof that connects to the cathode of the APD 12 via the bias line 15 and the current detector 18.

The current detector 18, provided between the voltage source 16 and the APD 14 on the bias line 15, generates a mirrored current Id that reflects the photo current Iapd and supplies this mirrored current Id to the voltage divider 20.

The voltage divider 20, connected to the output terminal 42 of the voltage source 16 to receive the output voltage Vh, and connected to the current detector to receive the mirrored current. The voltage divider 20 divides this output voltage Vh with a specific dividing ratio determined by two resistors, 51 and 52, to generate the divided voltage Vfb. The dividing ratio depends on the mirrored current Id. The voltage divider 20 includes the first and second resistors connected in serial to each other. One terminal of the first resistor 51 receives the output Vh via the bias liner 15, while the other terminal thereof is connected to one terminal of the second resistor 52. The other terminal of the second resistor 52 is grounded. The output of the current detector 18 is connected to the intermediate node between two resistors, 51 and 52, to inject the mirrored current Id into the second resistor 52. As described later in this specification, the divided voltage Vfb depends on both the output voltage Vh and the mirrored current Id.

The divided voltage Vfb is led to the input 43 of the controller 22, while the output 44 thereof is led to the voltage source 16 to provide a control signal Sc to the voltage source 16 to adjust the output voltage Vh. Specifically, the controller 22 adjusts the output Vh of the voltage source to balance the divided voltage Vfb with a reference value. That is, when the divided voltage Vfb is smaller than the reference value, the controller makes the output Vh of the voltage source high, while the controller makes the output Vh low when the divided voltage Vfb is greater than the reference value. Since the divided voltage reflects the mirrored current and the photo current Iapd is reflected in the mirrored current, the controller adjusts the output Vh of the voltage source depending on the photo current Iapd.

Moreover, the second resistor 52 of the present embodiment has the specific temperature dependence in the resistance thereof to compensate the temperature dependence of the APD 12. In another configuration, the first resistor 51 may have the specific temperature dependence to compensate the characteristic of the APD 12. In one example, when the APD 12 has a characteristic that the multiplication factor M thereof decreases as the temperature increases, this temperature dependence may be compensated for the second resistor 52 to have a negative temperature coefficient in the resistance thereof. Since the resistance of the second resistor 52 decreases as the temperature increases, the divided voltage Vfb tends to decrease. However, the controller 22 adjusts the output Vh to maintain the divided voltage Vfb to the reference value, which raises the output Vh, thereby increasing the bias voltage applied to the APD 12 to compensate the reduction of the multiplication factor M. When the first resistor 51 carries out the compensation for the temperature characteristic of the APD 12, the first resistor 51 may have a positive temperature coefficient in the resistance thereof.

Various techniques have been well known to realize the temperature dependence of the resistance. One example is that, the resistance thereof may be varied depending on the temperature monitored by, for instance, a thermistor installed within the optical receiver 100. In another method, the resistor to have the specific temperature dependence may be a temperature sensitive resistor or a digitally controlled variable resistor able to be controlled by the processor via the digital-to-analog converter, or a combination of these techniques may be applicable.

As shown in FIG. 2, the current detector 18 is a current mirror circuit that includes two pairs of a resistor and a transistor, one pair constituting a current-setting path, which is a right hand path in FIG. 2, while the other pair constituting a current-mirroring path, which is a left hand path.

When the photo current Iapd flows in the current-setting path constituted by the resistor 36 and the transistor 34, a mirrored current Id reflecting the photo current Iapd flows in the current-mirroring path constituted by the resistor 35 and the transistor 33. The mirrored current Id reflects, or is proportional to, the photo current Iapd. The ratio of the mirrored current Id to the photo current Iapd is called as a mirror ratio, which is decided by, assuming the size of each transistor equal to each other, the ratio of the resistance of resistors, 35 and 36. That is, assuming the resistance of the resistors, 35 and 36, are Re1 and Re2, respectively, the mirror ratio m becomes Re2/R21 and the mirrored current Id becomes:

$$Id = m^*Iapd = (Re2/Re1)^*Iapd. \quad (1)$$

The resistance of the resistors, 51 and 52, in the voltage divider 20 are R1 and R2, respectively, and the currents flowing in respective resistors are I1 and I2, then $$I2 = I1 + Id, \quad (2)$$

$$Vh = I1^*R1 + I2^*R2, \quad (3)$$

and $$Vfb = I2^*R2, \quad (4)$$

are obtained.

In the present control circuit 10, the first resistor 51 is 590 kΩ and the second resistor is 20 kΩ, respectively, at room temperature (25° C.). The reference value to which the controller 22 maintains the divided voltage Vfb by adjusting the output voltage Vh is 1.0 V. When the APD 12 receives no optical signal, the output voltage Vh is set to 60.0 V. Since the transistor 34 in the current monitor decreases the voltage in the collector-emitter voltage $V_{CE}$ by about 0.5 V, the bias voltage Vapd practically and directly applied to the APD 12 is about 59.5 V, which sets the multiplication factor M to be about 9.5 and secures the substantial optical sensitivity.

Receiving the optical signal, the APD 12 generates the photo current Iapd and the current monitor 18 outputs the mirrored current Id that is injected into the voltage divider 20. As one example of the current mirror circuit 10, the resistance of two resistors are Re1=5.1 kΩ and Re2=250 Ω, respectively, to set the mirror ratio to be 1/20. Accordingly, as shown in the equation (1), the mirrored current Id, which is 1/20 of the photo current, is injected into the voltage divider 20. The mirrored current Id becomes 15 μA when the photo current is, for example, 300 μA. The input impedance of the controller 22 is generally far greater than the resistance of two resistors. The current into the controller 22 can be ignored.

According to the equation (4), a current I2 flowing in the second resistor 52 may be required to be kept 100 μA in order to keep the divided voltage Vfb of 1.0 V. Then, a current I1 flowing in the first resistor 51 becomes I2−Id=85 μA from the equation (2), and, from the equation (3), the output voltage Vh may be simply calculated as, $Vh=85\ \mu A*590\ k\Omega+100\ \mu A*10\ k\Omega=51.15\ V.$ That is, the controller 22 adjusts the voltage output Vh to 51.15 V, which is lowered by 8.85 V from the case of no optical input signal.

As clearly shown from the equations from (1) to (4), as the optical input power increases and, as a consequence, the photo current Iapd and the mirrored current Id also increase, the current I2 flowing in the second resistor 52 increases, which raises the divided voltage Vfb. The controller 22 operates to equalize the divided voltage Vfb to the reference value. Accordingly, the output voltage Vh decreases depending on the increase of the photo current Iapd and the mirrored current Id. Conversely, when the optical input decreases, which results in the reduction of the photo current Iapd and the mirrored current Id, the controller raises the output voltage Vh to equalize the divided voltage Vfb to the reference value.

Thus, the bias voltage Vapd practically applied to the APD 12 increases or decreases depending on the optical input power. The multiplication factor M of the APD 12 strongly depends on the applied bias voltage, accordingly, the multiplication factor M may be also adjusted as the magnitude of the optical input signal, which prevent the APD 12 from breaking by the self-generating photo current.

The mirror ratio m is set such that the mirrored current Id becomes smaller than a current that flows in two resistors, 51 and 52, at no optical signal. That is, the photo current and, consequently, the mirrored current become zero, Iapd=Id=0, at not optical signal, the current I0 flowing in two resistors, 51 and 52, becomes;

$I0(=I1=I2)=Vh/(R1+R2).$

The mirrored current Id cannot exceed this current. In the present embodiment, I0=60 V/(590 kΩ+10 kΩ)=100 μA, and the mirror ratio is set to be 1/20, accordingly, the photo current Iapd is limited below 100 μA*20=2 mA, because the controller 22 adjusts the output voltage Vh lowers.

The adjustment of the bias voltage for the APD may be realized by, as shown in Japanese prior patents published as H11-284445 or 2000-071892, that the APD provides a resistor connected in serial thereto and lowers the bias voltage by flowing the photo current therein. However, such technique may not contribute to the power reduction of the light-receiving circuit because the output of the voltage source is maintained in constant. On the other hand, the present circuit lowers the output Vh of the voltage source 16 depending on the increase of the photo current Iapd, accordingly, the power consumption of the circuit may be saved.

Figure 3:
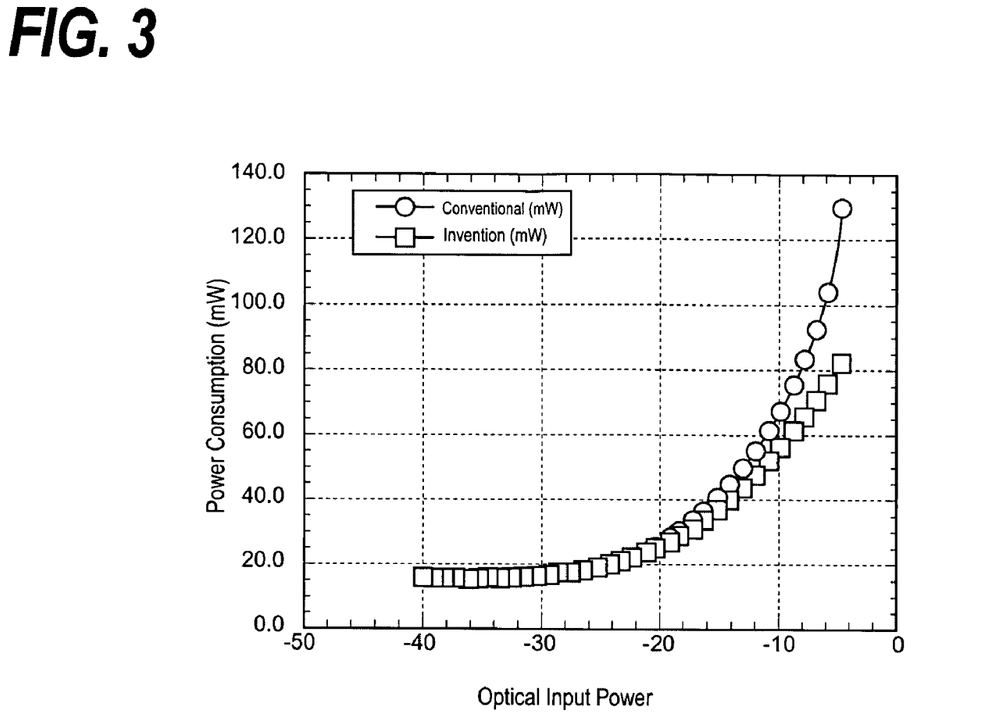
FIG. 3 compares the power consumption of the light-receiving circuit of the present invention with the conventional circuit.
Figure 4A:
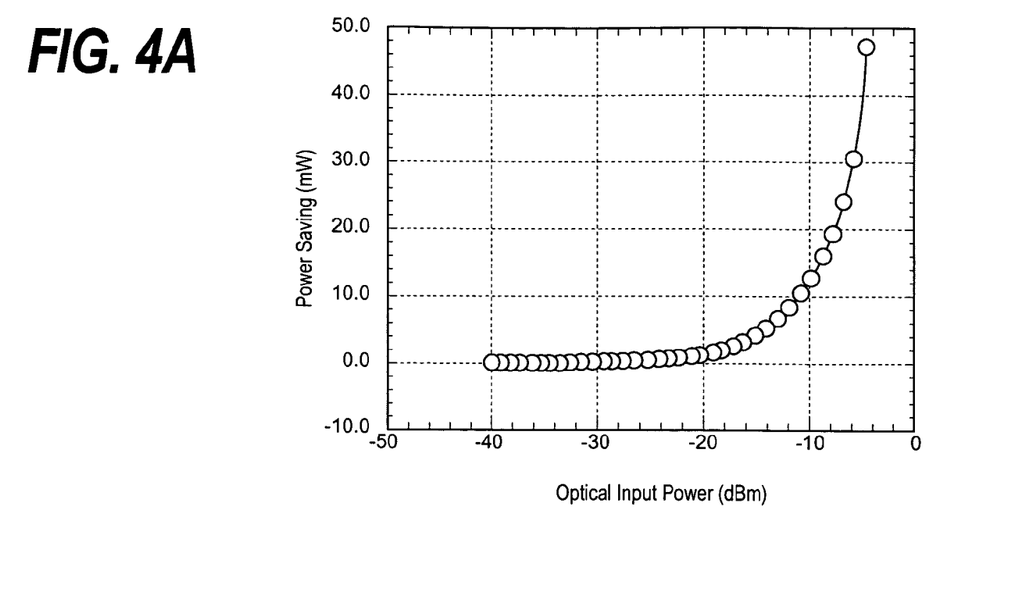
FIG. 4A shows the reduction of the power consumption of the light-receiving circuit in an absolute scale.
Figure 4B:
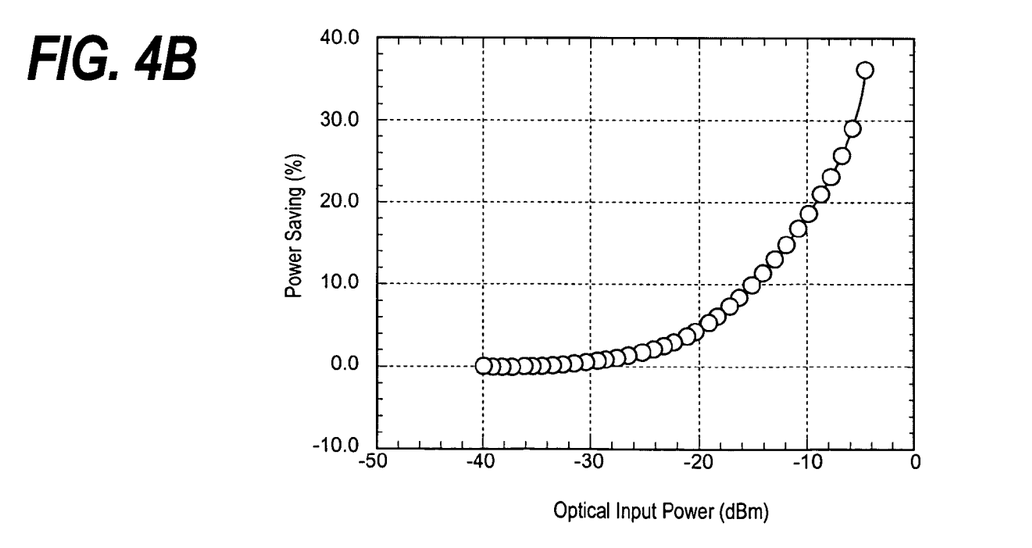
FIG. 4B shows the reduction of the power consumption in a relative scale.

FIG. 3 compares the power consumption of the light-receiving circuit of the present invention with that of the prior art, 2004-071892. The power consumption increases as the optical input power increases in both circuits. However, the present invention suppresses the increase at the large optical input power. FIG. 4A and FIG. 4B show the amount of the power saving in absolute and in relative, respectively. The light-receiving circuit 100 of the present invention saves the power consumption by about 30 mW at the optical input of −7 dBm, which attains 29% saving of the power consumption. In these figures, an APD with an optimal bias voltage of +60 V at no optical input is used. The power saving shown in these figures may depend on the APD used in the test.

(Second Embodiment)

Figure 5:
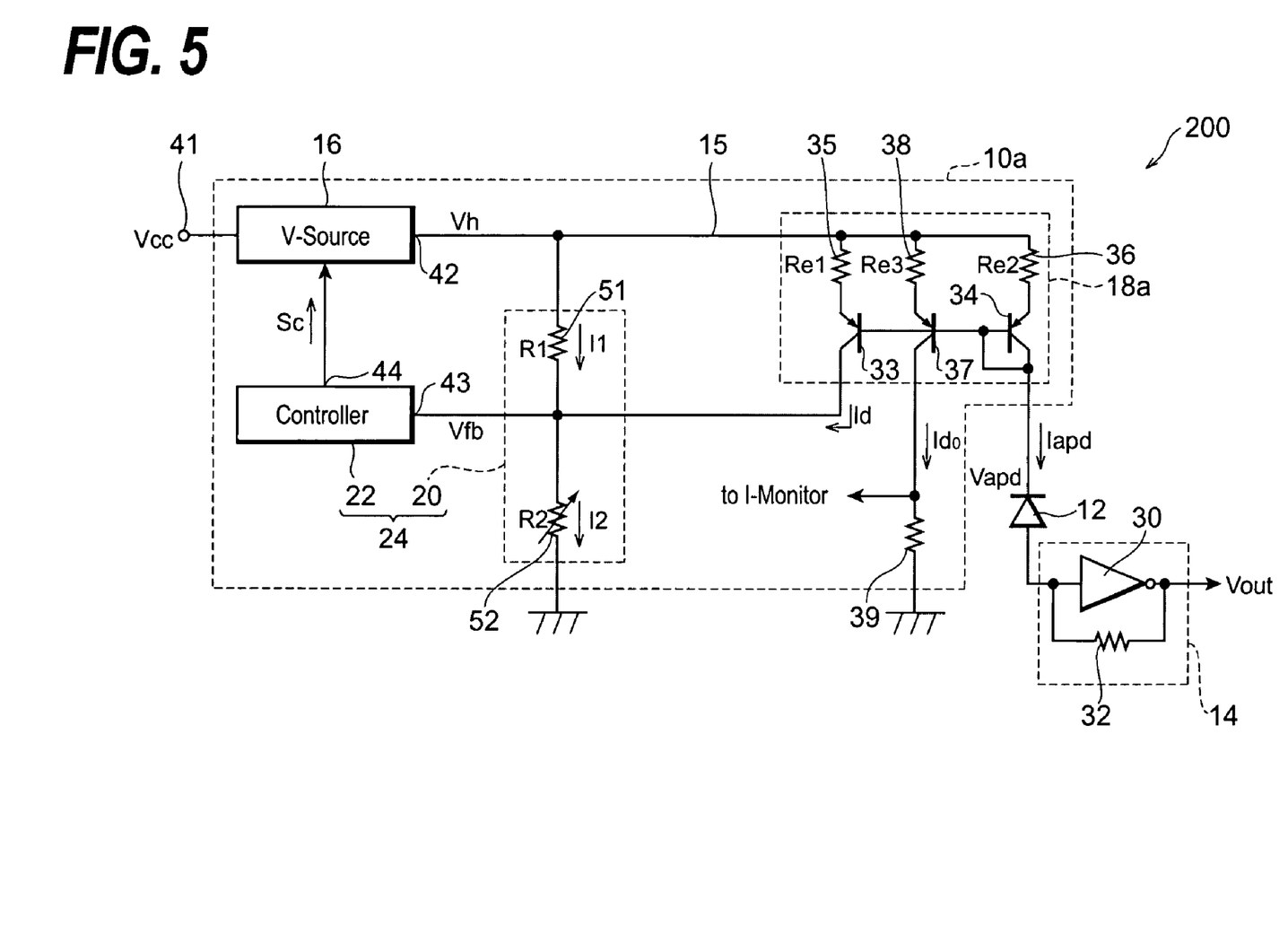
FIG. 5 shows the second embodiment of the light-receiving circuit according to the invention.

Next, the second preferred embodiment of the invention will be described. FIG. 5 shows a light-receiving circuit 200 of the second embodiment. The circuit 200 substitutes a second current detector 18a for the current detector 18 of the first embodiment. The current detector 18a includes a transistor 37 and a resistor 38 in addition to the original current detector 18. The added transistor 37 and the resistor 38 also constitute the current mirror circuit. Generating the photo current Iapd by the APD 12, the current mirror circuit reflects this photo current Iapd in the mirrored current Id0 that flows out from the transistor 37 to the resistor 38. Assuming the resistance of resistors, 36 and 38, are Re2 and Re3, respectively, the mirror ratio m becomes m=Re2/Re3. This mirrored current Id0 flows in the resistor 39 to cause a voltage drop therein.

The resistor 39 is connected to the current monitor circuit, which is not shown in FIG. 5, and may be displaced within the light-receiving circuit 200 or in the outside thereof. The current monitor detects the presence of the photo current Iapd, which enables the bias-controlling circuit 10a to detect a trouble occurred in the APD 12. Thus, the bias controlling circuit 10a, in addition to save the power consumption at a high optical input, may notify the existence of the photo current Iapd to the peripheral circuit thereof.

(Third Embodiment)

Figure 6:
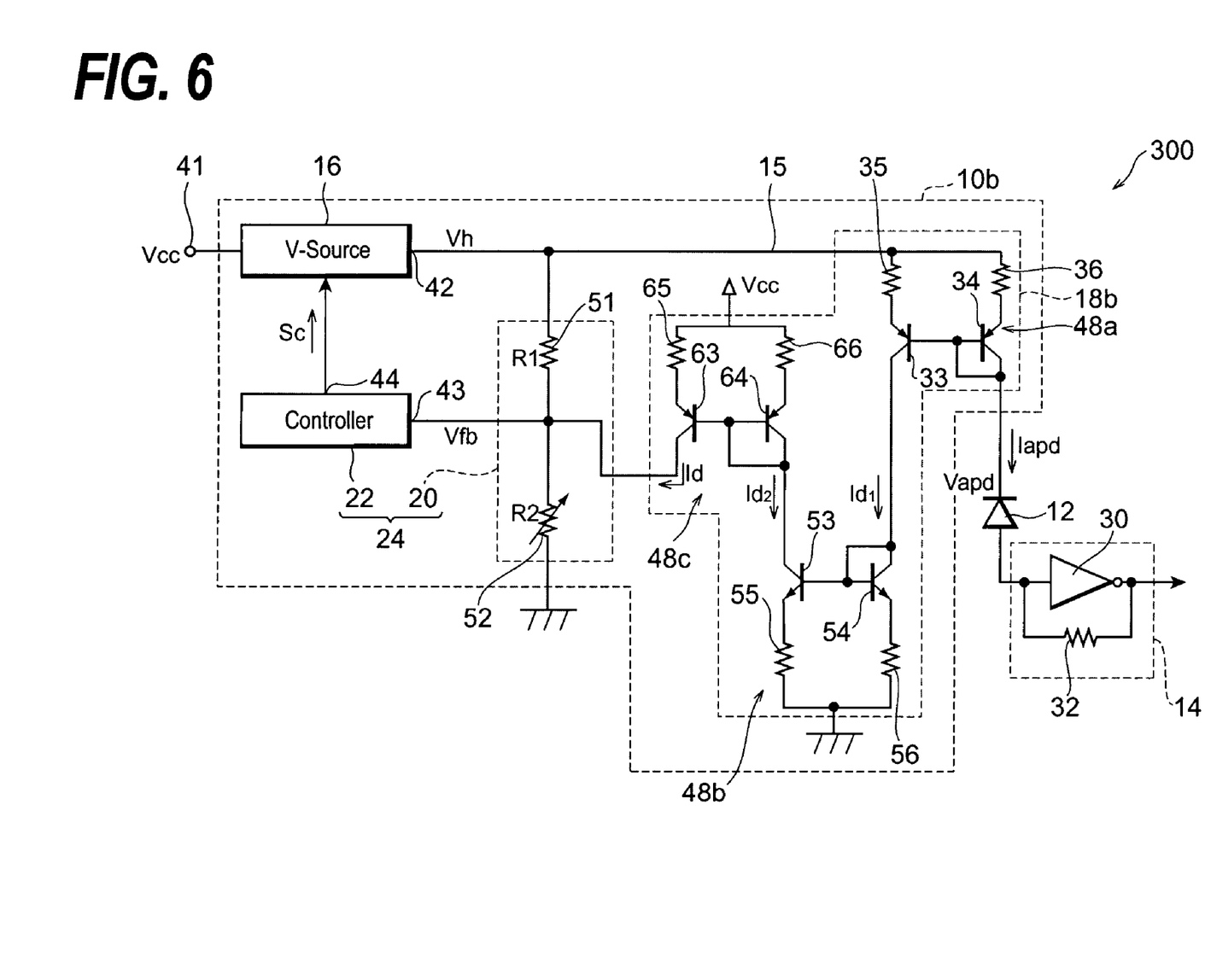
FIG. 6 is shows the third embodiment of the light-receiving circuit according to the invention.

The third embodiment of the invention will be described below. FIG. 6 shows the third light-receiving circuit 300 according to the invention, which substitutes a current detector 18b for the current detector 18 in the first embodiment.

The current detector 18b provides, in addition to the first current mirror circuit 48a in the first embodiment, second and third current mirror circuits, 48b and 48c. These current mirror circuits, 48a to 48c, are connected to each other to relay a mirrored current. That is, a mirrored current generated at the upstream mirror circuit flows into a current setting path of the present mirror circuit, and is reflected to the mirrored current of the present stage.

Generating the photo current Iapd, the first current mirror circuit 48a reflects the mirrored current $Id_1$ in the current-mirroring path thereof. As mentioned in connection with the first embodiment, the resistance of two resistors determines the mirror ratio $Id_1$/Iapd assuming that the size of the transistors are identical to each other. This mirrored current $Id_1$ flows from the transistor 33 into the current-setting path of the second current mirror circuit 48b and is reflected in the second mirrored current $Id_2$. The resistance of two resistors, 55 and 56, decides the mirror ratio ($Id_2/Id_1$) of this current mirror circuit 48b same as that of the first mirror circuit 48a. The second mirrored current $Id_2$ flows from the transistor 53 into the current-setting path of the third current mirror circuit 48c and is reflected in the mirrored current Id.

The resistance of two resistors, 65 and 66, determine the mirror ratio $Id/Id_2$.

Consequently, the current detector 18b generates the mirrored current Id reflecting the photo current Iapd. The mirror ratio Id/Iapd, which is the total mirror ratio for three current mirror circuits, 48a to 48c, is determined by the resistance of resistors, 33, 34, 55, 56, 65, and 66. This configuration has an advantage that the resistance of two resistors, 55 and 56, may control the total mirror ratio. It will be safe and reliable that the resistors, one terminal thereof are grounded, may control the mirror ratio because the bias line 15, on which the output Vh is impressed, is generally biased in a high voltage.

Moreover, the first and second embodiments configures that the input terminal 43 of the controller 22 couples with the bias line 15 via the transistor 33 and the resistor 35. Under the ordinal condition, since the voltage drop at the resistor 35 is not so large, the controller 22 may receive a high voltage of the bias line and may be damaged when the transistor 33 breaks. On the other hand, the present configuration puts two current mirror circuits, 48b and 48c, to the bias line 15, the controller may be prevented from receiving the high voltage only one transistor breaks. Thus, the light-receiving circuit of the present embodiment shows a preferable safety in addition to the advantage already mentioned in the first embodiment.

(Fourth Embodiment)

Figure 7:
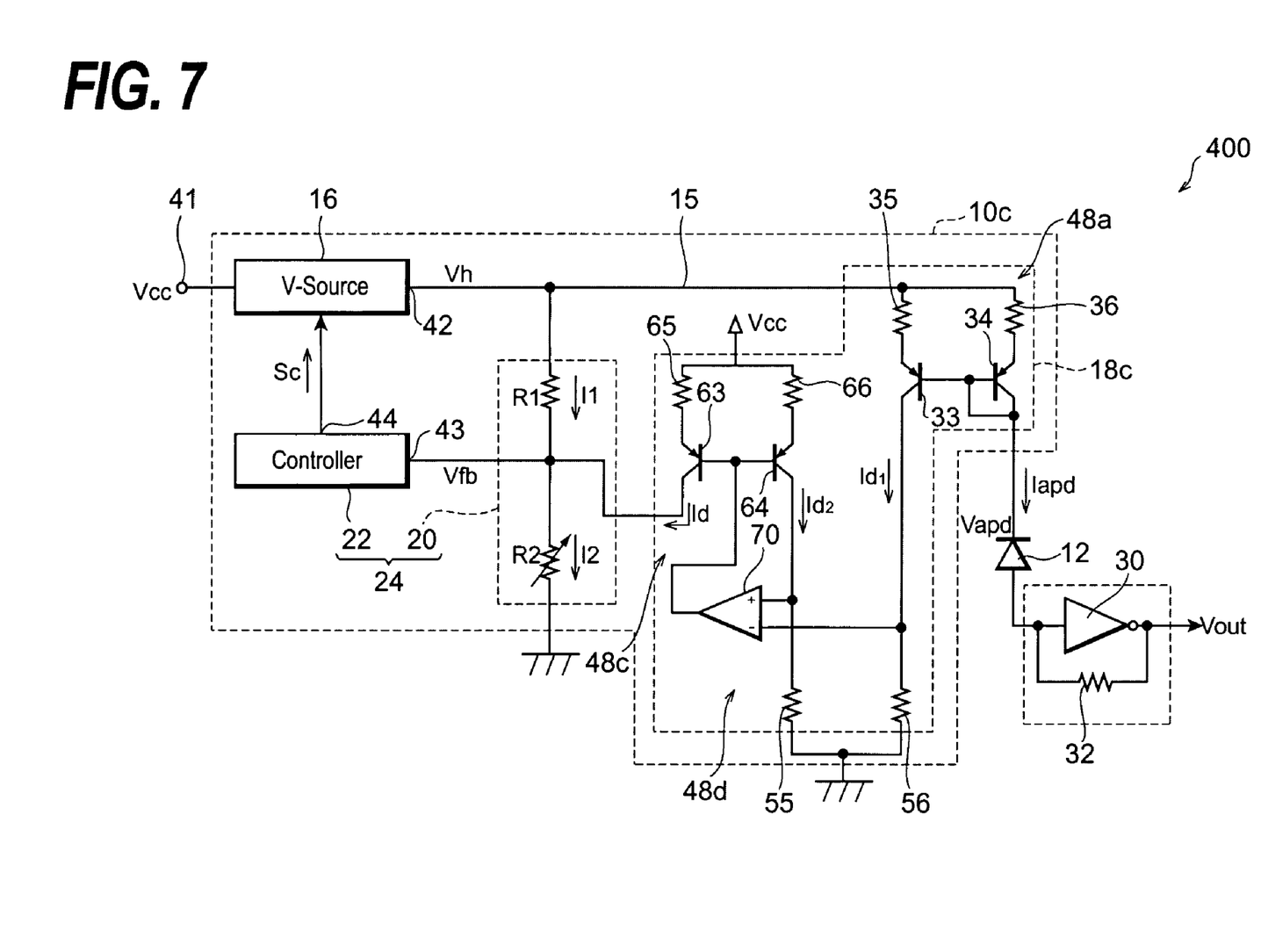
FIG. 7 is shows the fourth embodiment of the light-receiving circuit according to the invention.

The fourth embodiment of the invention will be described. FIG. 7 shows a fourth light-receiving circuit 400 that substitutes the current detector 18b of the third light-receiving circuit 300 described above for another current detector 18c.

The current detector 18c provides, instead of the current mirror circuits, 48b and 48c, of the third embodiment, another type of the current mirror circuit 48d that includes two resistors, 55 and 56, and an operational amplifier (Op-Amp) 70. An inverting input port of the Op-Amp 70 connects to the transistor 33 and receives the voltage drop at the resistor 56 due to the mirrored current $Id_1$ of the first current mirror circuit 48a. The non-inverting input port of the Op-Amp 70 connects to the transistor 64 and receives the voltage drop at the resistor 55 due to the current $Id_2$. The output port of the Op-Amp 70 connects to the bases of two transistors, 63 and 64.

The operation of the Op-Amp 70 is that the output thereof is so adjusted as to equalize two input port, the inverting and non-inverting inputs. In other words, the output of the Op-Amp 70 is so operated as to identical the voltage drop due to the resistors, 55 and 56, to each other. Assuming the resistance of two resistors, 55 and 56, Rc1 and Rc2, respectively, the current $Id_2$ flowing in the transistor 64 becomes, $$Id_2=(Rc2/Rc1)*Id_1. \qquad (5)$$

Thus, the current mirror circuit 48d flows the current $Id_2$ reflecting the current $Id_1$ in the current-setting path thereof. The resistance of the resistors, 55 and 56, may determine the mirror ratio m of the current mirror circuit, which is similar to those described in the third embodiment.

(Fifth Embodiment)

Figure 8:
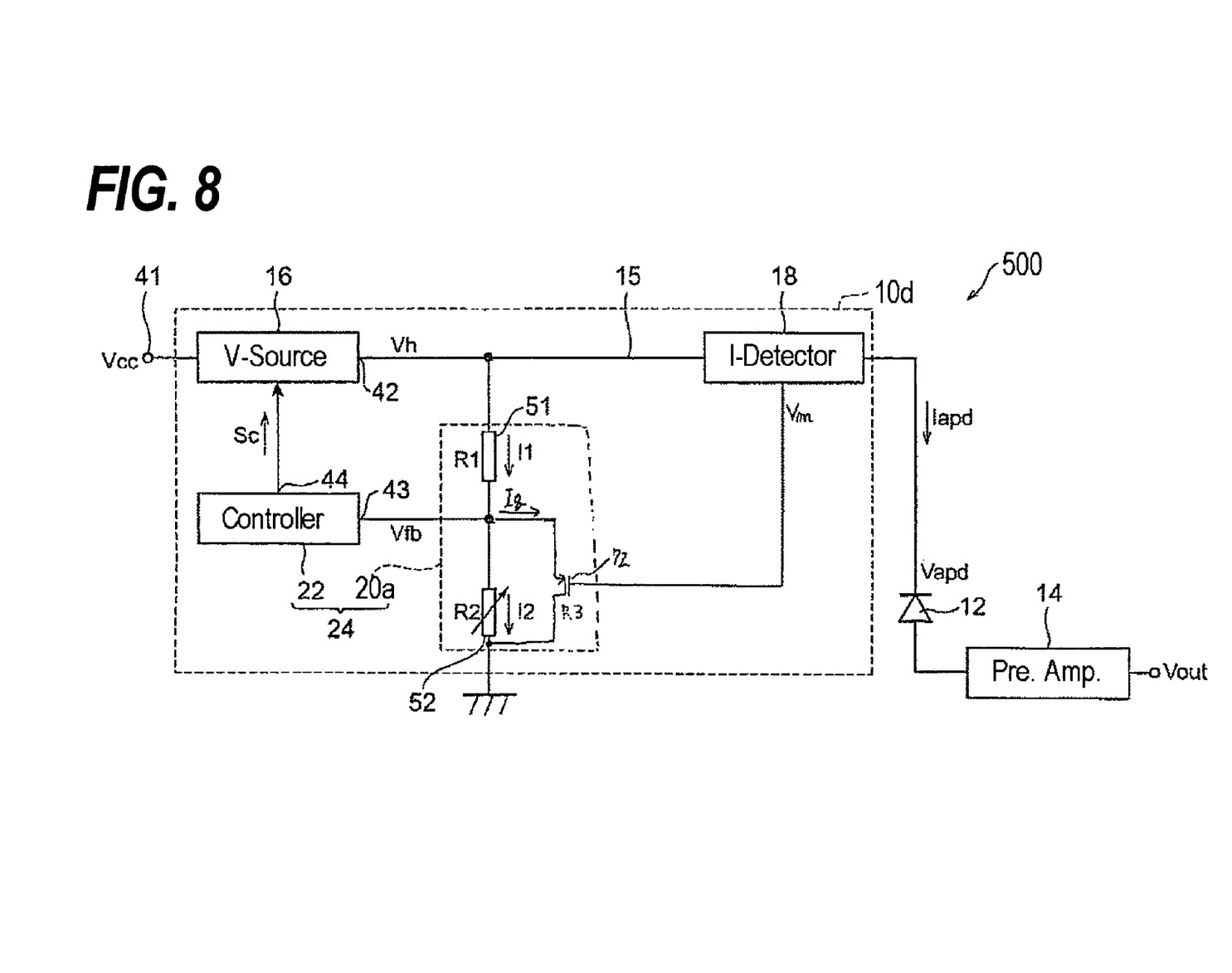
FIG. 8 is a block diagram of the light-receiving circuit with different configuration shown in FIG. 1.

FIG. 8 is a block diagram showing a light-receiving circuit 500 according to the fifth embodiment of the invention. The light-receiving circuit 500 in FIG. 8 is different in the configuration of the voltage divider 20 and the output of the current detector 18.

The voltage divider 20a comprises two resistors, 51 and 52, connected in serial to each other, and a field effect transistor (FET) 72 connected in parallel to the second resistor 52. In FIG. 8, the current flowing in the resistors, 51 and 52, are denoted as I1 and I2, respectively. The FET 72 is a p-MOSFET in the present embodiment whose gate receives the monitored voltage Vm of the current detector 18.

The voltage divider 20a divides the output voltage Vh by a ratio D, which is calculated as $$D=(R2//R3)/\{R1+(R2//R3)\} \qquad (6)$$

and the divided voltage Vfb becomes $$Vfb=Vh*D=Vh*(R2//R3)/\{R1+(R2//R3)\}. \qquad (7)$$

where R2//R3 means the parallel resistance of the second resistor 52 and the equivalent resistance of the FET 72. From the equation above, the divided voltage Vfb increases as increasing the parallel resistance (R2//R3) or as increasing the equivalent resistance of the FET 72 because the resistance of the second resistor 52 does not change.

The controller 22, by receiving this divided voltage Vfb, adjusts the output Vh of the voltage source to equalize the divided voltage Vfb with the reference value, which is same as those embodiments already described. The divided voltage Vfb reflects the equivalent resistance of the FET 72 and the gate thereof receives the output of the current detector 18, accordingly, the controller 22 adjusts the output Vh of the voltage source depending on the photo current Iapd.

Figure 9:
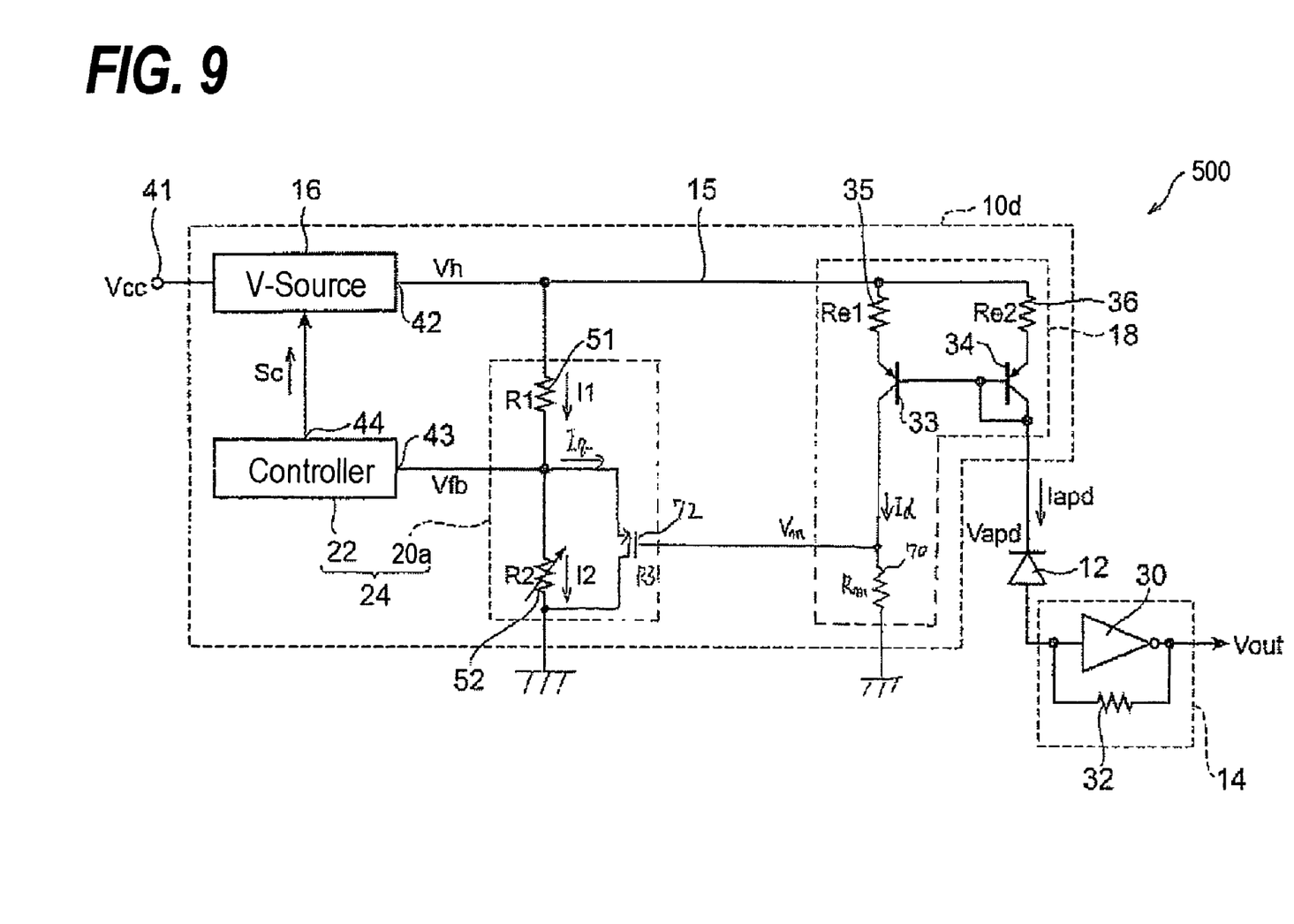
FIG. 9 is shows the fifth embodiment of the light-receiving circuit according to the invention.

One example will be described in FIG. 9. The monitored voltage Vm becomes 0 at no optical input because no photo current Iapd is generated by the APD 12. Under this condition, the drain current Iq of the FET 72 becomes about 13 µA, whereby the equivalent resistance of the FET 72 is 1 V/0.013 mA~77 kΩ, because the divided voltage Vfb is maintained to the reference value of 1 V, by the controller. Then, the output voltage Vh becomes, $$Vh=\{1\ V/(R1=10\ k\Omega)+0.013\ mA\}*(R1=520\ k\Omega)+1\ V\sim59.7\ V. \qquad (8)$$

Since the transistor 34 within the current detector drops the voltage by about 0.5 V, the bias voltage Vapd practically applied to the APD 12 becomes 59.2 V, which is comparable to those of the first to fourth embodiments because the resistance of the first resistor 51 is reduced to 520 kΩ in the present embodiment, thereby securing the multiplication factor M of the APD 12 to be 9.5 that reveals the substantial sensitivity.

The APD 12 generates the photo current Ipad which is reflected to the mirrored current Id by the current mirror circuit 18, and is converted into the monitored voltage Vm by the resistor 70. This monitored voltage Vm is applied to the gate of the FET 72 to set the drain-source voltage, in other words, to set the drain current thereof. The monitored voltage Vm increases as the optical input power increases, which reduces the drain current Iq of the FET and equivalently raises the equivalent resistance of the FET 72. Consequently, the combined resistance of the second resistor 52 and the FET 72 also increases. According to the equation (7), although the divided voltage Vfb may vary as the equivalent resistance of the FET 72, which depends on the optical input power as described above, the controller 22 operates to keep the divided voltage Vfb constant identical to the reference value by adjusting the output Vh of the voltage source.

The present embodiment may set, as one example thereof, the resistance of the resistors in the current mirror circuit 18, Re1=Re2=1 kΩ, and that of the resistor Rm for the monitoring, Rm=5 kΩ. Therefore, rising the monitored voltage Vm from 0 V to 1.5 V, the FET 72 will be gradually cut off to decrease the drain current Iq thereof to 2 μA. The controller 22, as mentioned before, operates to maintain the divided voltage Vfb to be equal to the reference value by adjusting the output voltage Vh. Consequently, the output voltage Vh becomes, $$Vh=\{(Vfb=1\ V)/(R2=10\ k\Omega)+0.002\ mA\}*(R1=520\ k\Omega)+1\ V\sim52\ V, \quad (9)$$

which is reduced by 7.7 V from the condition at no optical input.

Figure 10:
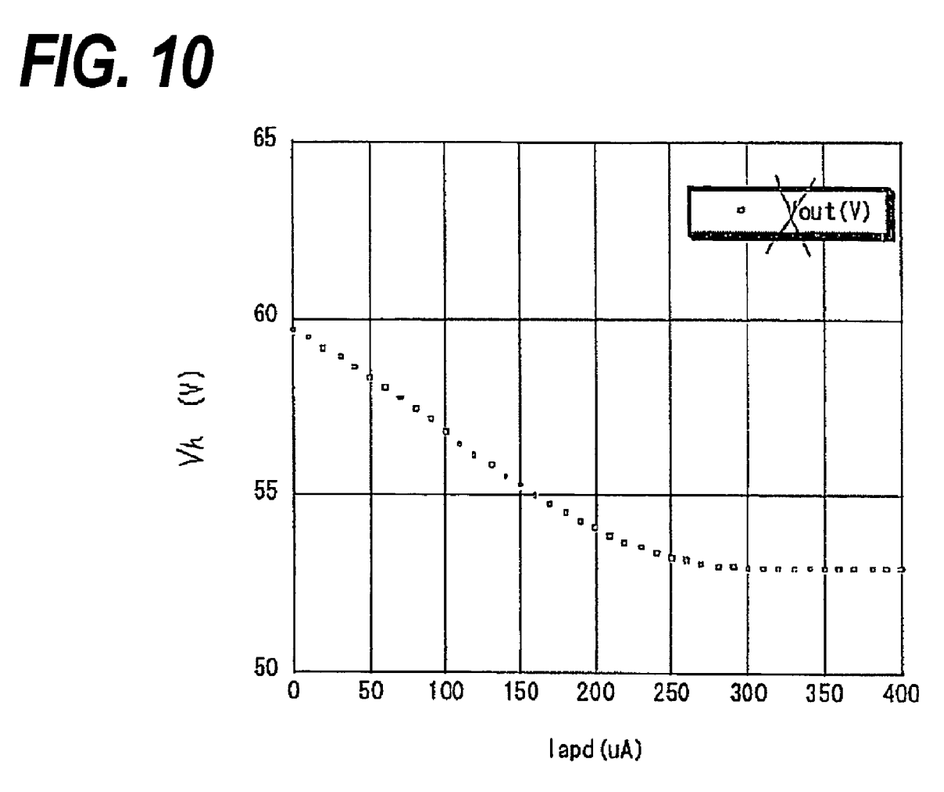
FIG. 10 shows a behavior of the output Vh of the voltage source against the photo current Iapd, which reflects the magnitude of the optical input.

FIG. 10 is a behavior of the output Vh of the voltage source 16 against the photo current Iapd. The output voltage Vh varies depending on the photo current below 250 μA thereof, while is constant in the region exceeding 250 μA, where the FET 72 is cut off. Thus, the output voltage Vh, i.e., the bias voltage applied to the APD 12, lowers as the optical input decreases, which also reduces the multiplication factor M of the APD 12. Accordingly, the photo current Iapd may be suppressed when the optical input becomes large, which prevent the APD 12 from breaking due the self-generated photo current.

The adjustment of the bias voltage for the APD may be realized by, as shown in already described prior patents, H11-284445 and 2000-071892, that the APD provides a resistor connected in serial thereto and lowers the output voltage from the voltage source by flowing the photo current in this resistor. However, such technique may not contribute to the power reduction of the light-receiving circuit because the output of the voltage source is maintained in constant. On the other hand, the present circuit lowers the output voltage Vh depending on the increase of the photo current Iapd, accordingly, the power consumption of the circuit may be saved.

(Sixth Embodiment)

Figure 11:
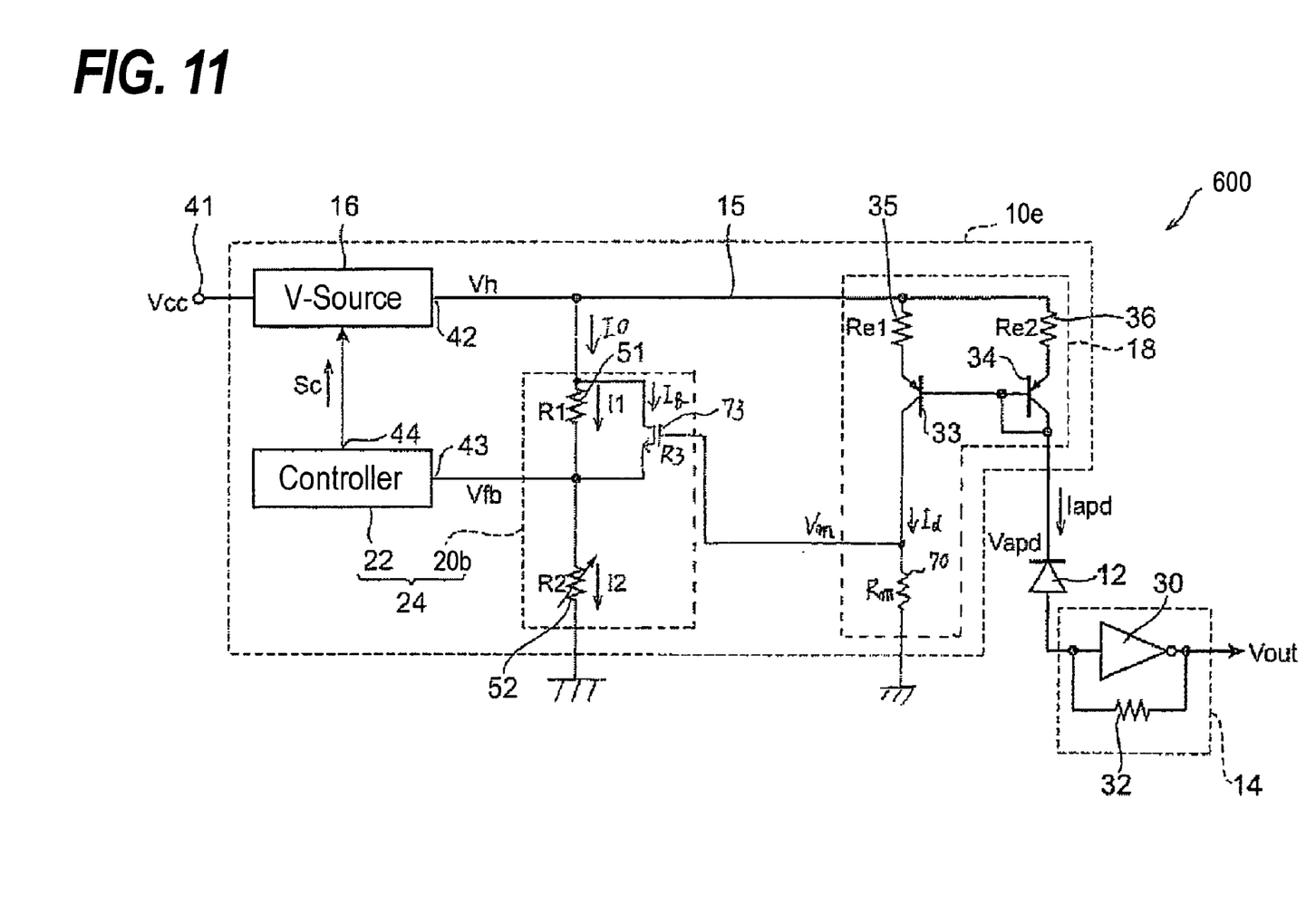
FIG. 11 shows the sixth embodiment of the light-receiving circuit according to the invention.

Next, the sixth embodiment of the invention will be described. FIG. 11 shows a light-receiving circuit 600 and another bias controlling circuit 10e. The bias controlling circuit 10e includes a new voltage divider 20b, which substitutes the transistor 72 in the preceding voltage divider 20a for another transistor 73 that is an n-type MOSFET and is connected in parallel to the first resistor 51. The gate of the FET 73, similar to the preceding embodiment, receives the monitored voltage Vm from the current detector 18.

The divided voltage Vfb in the present embodiment is denoted as, $$Vfb=Vh*(R2/\{(R1//R3)+R2\}, \quad (10)$$

instead of the equation (7), where (R1//R3) is a parallel resistance of the resistor R1 and the transistor 73, which are connected in parallel to each other.

Since the photo current becomes 0 mA at no optical input, the monitored signal also becomes 0 V, which make the transistor 73 off and the divided voltage Vfb{Vh*R2/(R1+R2)}. Receiving the substantial optical input, the APD 12 generates the photo current and the current detector 18 outputs the monitored voltage Vm with a substantial value, which defines the gate bias of the transistor 73. This monitored voltage Vm becomes greater as the magnitude of the optical input increases and decreases the parallel resistance of the first resistor R1 and the transistor 73.

The control circuit 22 operates to maintain the divided voltage Vfb equal to the reference value, accordingly, the output Vh decreases as the magnitude of the optical input increases. Oppositely, the output Vh increases as the optical input decreases.

(Seventh Embodiment)

Figure 12:
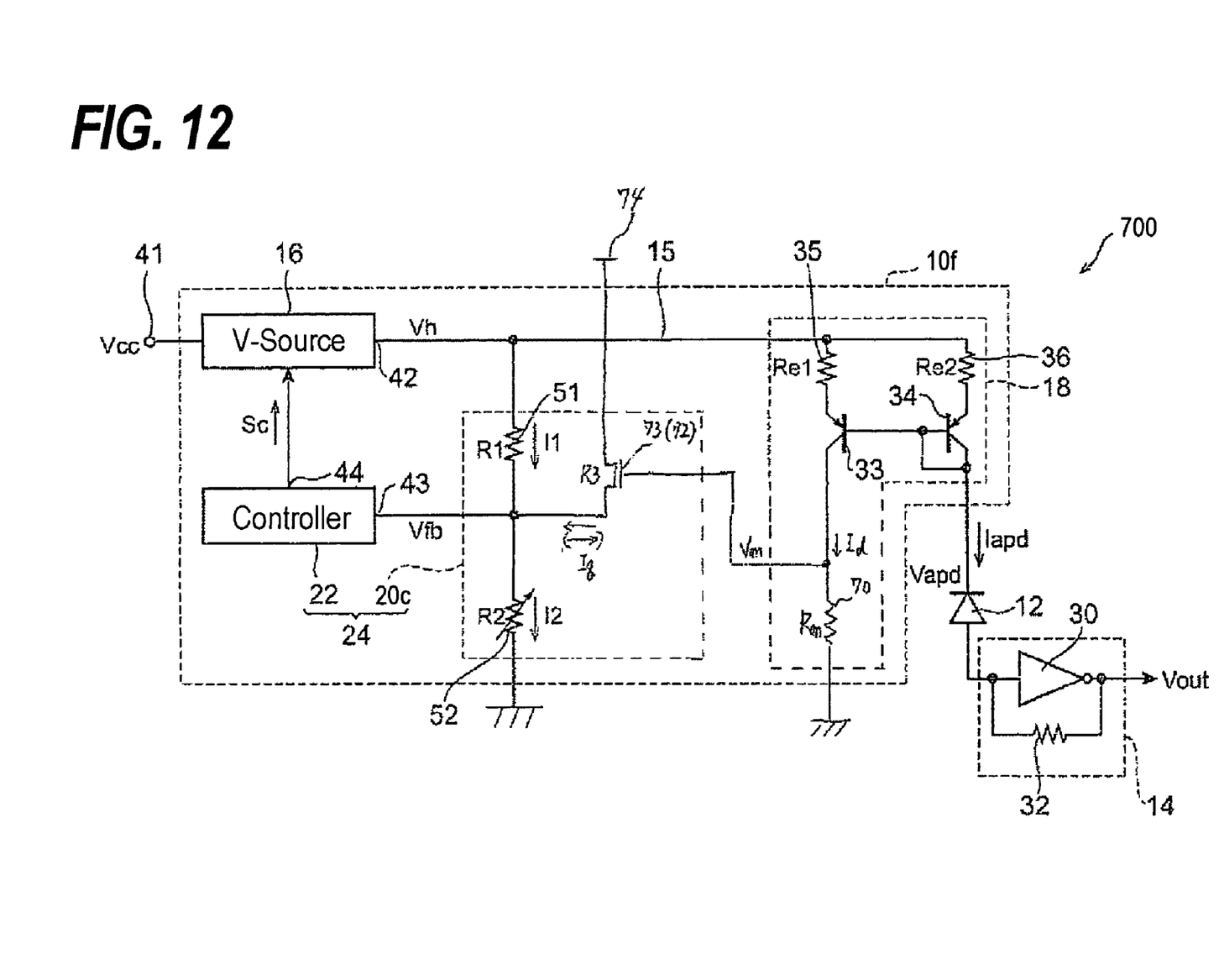
FIG. 12 shows the seventh embodiment of the light-receiving circuit according to the invention.

Next, the seventh embodiment of the invention will be described as referring to FIG. 12. The bias controlling circuit 10f of the present light-receiving circuit 700 substitutes the voltage divider 20c for the circuit 20b in the preceding embodiment.

The voltage divider 20c is different to the preceding divider 20b in the point that the drain of the FET 73 is connected to a power supply 74. The drain current Iq, which depends on the gate bias of the FET 73, and the current I1 flowing in the first resistor 51 are summed to the current I2 flowing in the second resistor 52.

In the present embodiment, the drain current Iq increases as the gate bias of the transistor is raised, namely, the magnitude of the optical input increases. Increasing the drain current Iq raises the divided voltage Vfb, while the decrease of the optical input, which reduces the monitored voltage Vm, decreases the drain current and the divided voltage Vfb. However, since the controller 22 operates to maintain the divided voltage Vfb equal to the reference voltage by adjusting the output Vh of the voltage source. Accordingly, the present embodiment provides the same function that the output Vh of the voltage source varies so as to compensate the magnitude of the optical input.

The FET 72, which is the p-type MOSFET configured in the previous embodiment, may replace the FET 73, the n-type MOSFET. In such case, the power supply 74 is necessary to be lower than the divided voltage Vfb. The current I1 flowing in the first resistor 51 is divided into the current I2 flowing in the second resistor 52 and the drain current Iq of the transistor 72.

Thus, although the present invention is described as referring to accompanying drawings, the invention is not restricted to such preferred embodiments and may be applicable in various configurations. For example, the preceding embodiments use the FET to vary the dividing ratio of the voltage divider, but a bipolar transistor may be replaced with the FET. In this case, the current detector is unnecessary to provide the monitoring resistor Rm, and the current-mirroring path of the current mirror circuit is able to connect in directly to the base of this bipolar transistor. Such modification may show the same function and advantages with those described in connection with the preceding embodiments.

What is claimed is:

1. A light-receiving circuit including a bias-controlling circuit for an avalanche photodiode, said bias-controlling circuit comprising:
    a voltage source for outputting a voltage output
    a current detector for detecting a photo current generated by the avalanche photodiode;
    a voltage divider including a first resistor and a second resistor connected in serial to each other to divide the voltage output with a dividing ratio for outputting a divided voltage divided by the first and second resistors; and
    a controller operating to maintain the voltage output of the voltage divider equal to a reference value by adjusting the voltage output of the voltage source.

2. The light-receiving circuit according to clam 1, wherein the current detector outputs a current signal corresponding to the photo current to the voltage divider to vary a current flowing in the second resistor of the voltage divider.

3. The light-receiving circuit according to claim 2,
wherein the current detector includes a first current mirror circuit comprising a current-setting path and a current-mirroring path substantially configured in parallel to each other, the avalanche photodiode being connected to an output of the current-setting path and the current signal being output from the current-mirroring path.

4. The light-receiving circuit according to claim 3,
wherein the current detector further includes a second current mirror circuit and a third current mirror circuit each including a current-setting path and a current-mirroring path, the current-setting path of the second current mirror circuit being continued to the current mirroring path of the first current mirror circuit to receive a current mirroring the photo current set by the current-setting path of the first current mirror circuit, the current setting path of the third current mirror circuit being continued to the current-mirroring path of the second current mirror circuit to receive a current mirrored by the second current mirror circuit, the current signal being extracted from the current-mirroring path of the third current mirror circuit.

5. The light-receiving circuit according to claim 3,
wherein the current detector further includes a second current mirror circuit and an operational amplifier with a non-inverting input port, an inverting input port and an output port, the inverting input port being connected to the current-mirroring path to receive a first voltage signal reflecting a current mirrored from the photo current, the non-inverting input port being connected to the current-setting path of the second current mirror circuit to receive a second voltage signal, and the output port of the operational amplifier being supplied to the current-setting path of the second current mirror circuit to equalize the first voltage signal to the second voltage signal, the current signal being extracted from the current-mirroring path of the second current mirror circuit.

6. The light-receiving circuit according to claim 1,
wherein the current detector outputs a voltage signal corresponding to the photo current to the voltage divider to vary the dividing ratio of the voltage divider.

7. The light-receiving circuit according to claim 6,
wherein the voltage divider further comprises a transistor connected in parallel to the first resistor, the voltage signal being input to the control terminal of the transistor to vary an equivalent resistance of the transistor.

8. The light-receiving circuit according to claim 6,
wherein the voltage divider further comprises a transistor connected in parallel to the second resistor, the voltage signal being input to the control terminal of the transistor to vary an equivalent resistance of the transistor.

9. The light-receiving circuit according to claim 6,
Wherein the voltage divider further comprises a transistor whose one of current terminals is connected to the first and second resistors, the voltage signal being input to the control terminal of the transistor to increase a current flowing in the second resistor.

10. The light-receiving circuit according to claim 1,
wherein the first resistor has a temperature co-efficient to compensate a temperature characteristic of the avalanche photodiode.

11. The light-receiving circuit according to claim 1,
wherein the second resistor has a temperature co-efficient to compensate a temperature characteristic of the avalanche photodiode.

* * * * *